U̇nited States Patent Office 2,941,421
Patented June 21, 1960

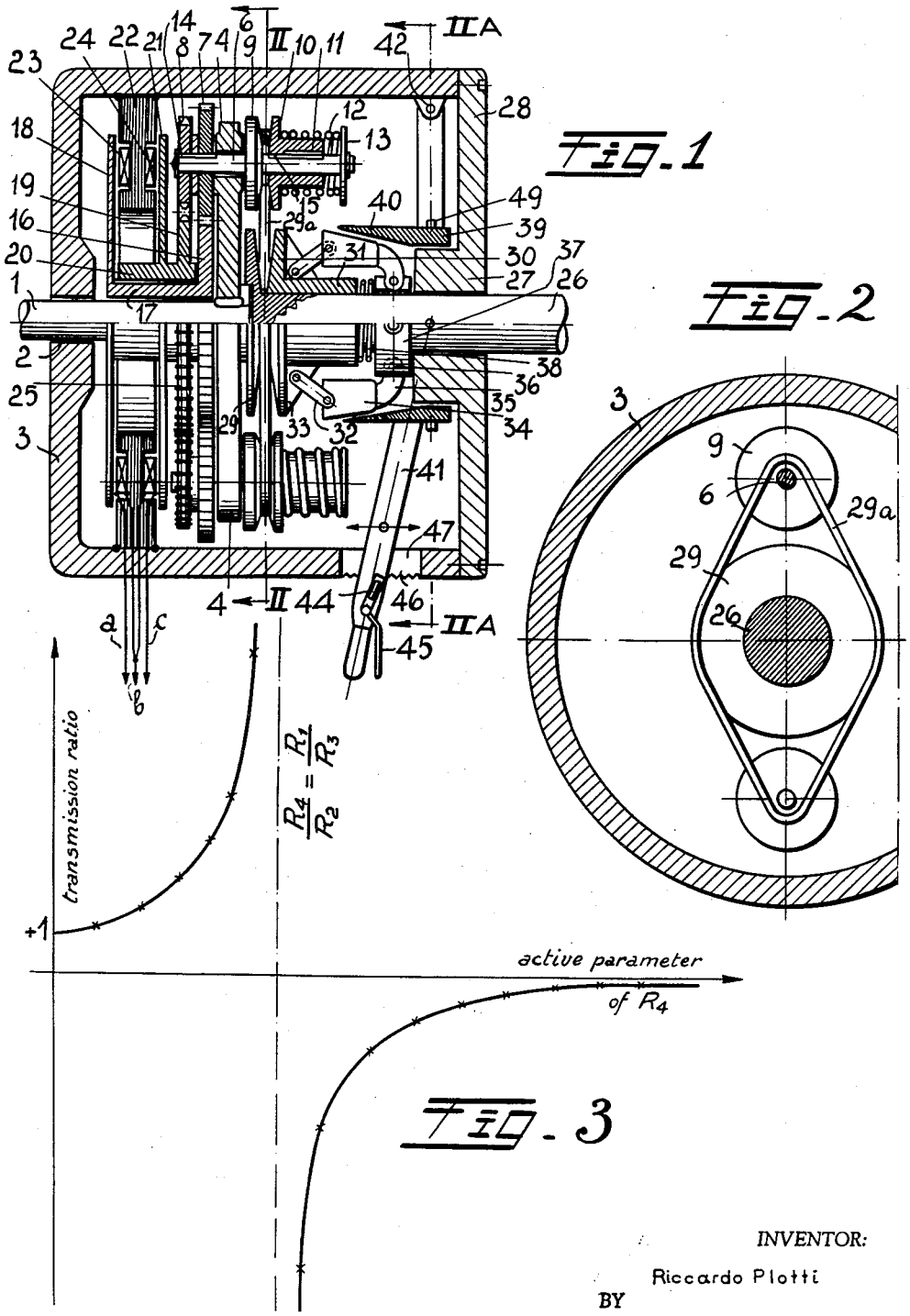

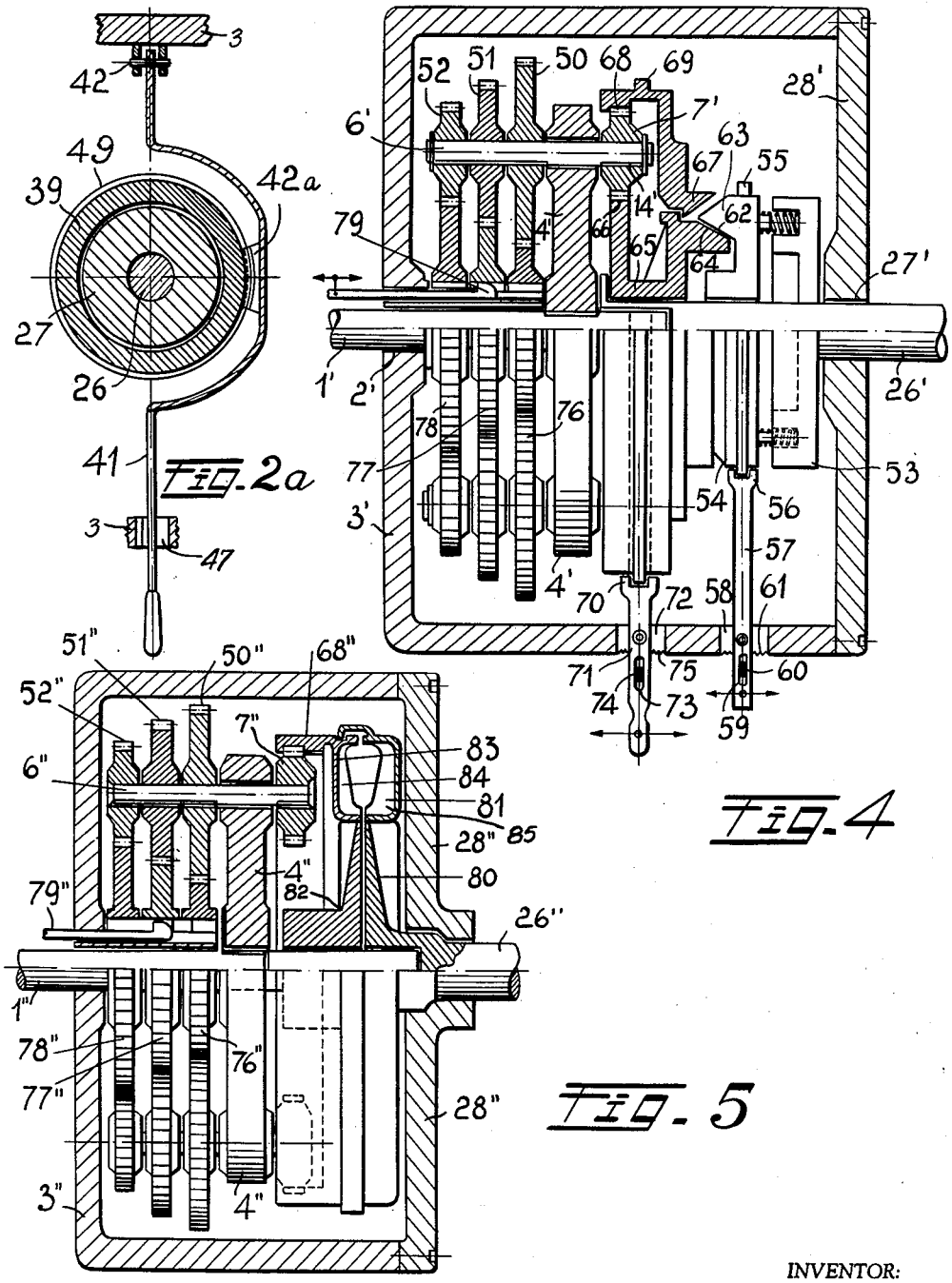

2,941,421
VARIABLE SPEED TRANSMISSION SUITABLE FOR REVERSING THE ROTATION SENSE

Riccardo Plotti, Via Traiano, 58, Milan, Italy

Filed Oct. 8, 1957, Ser. No. 688,973

11 Claims. (Cl. 74—766)

The present invention refers to a variable-speed transmission which is adapted also for use in reversing the direction of rotation.

Speed reducers of the epicyclic type are known wherein the main or driving shaft drives a rotating member which carries a plurality of planetary gears, obliged to roll on a toothed rim. Such reducers may achieve a remarkable gear reduction with a high efficiency.

An object of the present invention is to provide a variable-speed transmission of the type mentioned wherein the velocity of the driven or secondary shaft may be not only reduced but also controlled in such a manner that the gear reduction may vary within a very large range comprising also negative values which correspond to a reverse rotation in respect of a given direction of rotation (normally the sense of rotation of the driving shaft).

A more particular object of the present invention is to provide a variable-speed transmission of the type specified wherein remarkable speed variations may be achieved by means of relatively short excursions, displacements, and structural transformations of members interposed within the train between the driving and the driven shaft.

Another object of the present invention is to provide a variable-speed transmission of the specified type wherein the structural members are so arranged that the entire device becomes statically and dynamically equilibrated so as to allow the driving or input shaft, when turning at a very high number of revolutions, to give rise to rotations of the driven or input shaft with a high, low or zero number of revolutions, and to a working of the entire device without disequilibrium or vibrations due to unbalanced masses or forces.

A further object of the present invention is to enable the variable-speed transmission of the specified type to be designed in a manner that continuous and/or stepwise variations may be achieved, so that the variation be represented by a substantially hyperbolic curve the asymptotes of which start with the gear ratio of +1 and extend up to the infinite or conversely extend from the gear ratio of minus infinite up to zero.

These and other objects of the invention as well as the essential structural features of same will now be more particularly disclosed in the following detailed description relating to some representative embodiments shown in the accompanying drawing which is intended for an illustrative purpose only and not limitative and in which:

Fig. 1 shows, partially in longitudinal section and partially in side elevation, a first embodiment of a variable speed transmission;

Fig. 2A is a diagrammatical section along the line IIA—IIA of Fig. 1, showing the operative connection between two members of a device according to the invention;

Fig. 2 is a diagramatical section along the line II—II of Fig. 1;

Fig. 3 shows a diagram illustrating the variations of the gear ratio vs. variation of an active parameter of one of the members of the transmission of Fig. 1;

Figs. 4 and 5 show diagrammatically two other embodiments of the present invention, likewise partially in section and partially in side elevation.

As seen in Figs. 1 and 2, the driving or input shaft 1 is journaled in a bearing 2 of the housing 3 of the transmission. Within the housing, a planet carrier 4 is rigidly connected to the input shaft end; the planet carrier has here been shown for convenience as having the shape of a wheel. In convenient bearings situated near the perimeter of the planet carrier 4, there are loosely journaled two spindles 6.

On the input side of the planet carrier, there are mounted on the axes of spindles 6 in rigid rotary relationship (and, for structural convenience, on opposite sides of the planet carrier) units of two toothed wheels 7, 8 of different diameters, while on the output side of the carrier there are V-groove pulley members 9 formed by a discoidal element of frusto-conical shape. A discoidal counter-element 10 having a frusto-conical face symmetrically arranged to, and facing the frusto-conical side of the discoidal element 9 is provided with a tubular extension 11 and is mounted in axially movable relation on the respective spindle 6, the unit 10—11 being under the action of a helical spring 12, arranged around the tubular member 11 and bearing with one end thereof against the rear face of the discoidal element 10 and with the other end thereof against a plate 13, secured to the spindle 6. A key 14 obliges the toothed wheels 7 and 8 to rotate rigidly with the spindle 6, whereas a key 15, while allowing the pulley element 10 to effect a translatory displacement on the spindle 6, compels this pulley element to rotate with the spindle 6.

The toothed wheel 7 meshes with the toothed rim of a central wheel 16 having an elongated hub 17, which is loosely mounted on the shaft 1 and is provided with a radially extending flange 18. On the other hand, the toothed wheel 8 is connected by means of the sprocket chain 25 with the toothed rim of a central wheel 19, having an elongated hub 20, telescopically mounted on the hub 17 and provided with a radially extending flange 21, the hub 17 projecting axially beyond the hub.

The radially extending flanges 18 and 21 are arranged on both sides of an annular pack of laminations 22 influenced by the pole shoes 23 and 24, this pack 22 being rigidly connected with the stationary housing 3 of the transmission, while said pole shoes are connected through leads $a$, $b$ and $c$ to a convenient electrical power source by means of switches known per se.

The output shaft 26 is journalled on bearings 27 provided on a cover 28 adapted to fit on the housing 3 of the transmission at the inside end of the output shaft 26 a V-groove pulley element 29 is rigidly mounted, said element 29 having a frusto-conical shape, similar, except for dimensions, to the V-groove pulley element 9, while on said shaft 26 there is further mounted in axially movable relation a counter V-groove pulley element 30 provided with a tubular extension 31, the unit 30, 31 being compelled by a key (not shown) to rotate jointly with the shaft 26.

The V-groove pulley element 30 is provided with fins 33 whereon one end of links 32 is pivoted, the other end of links 32 being hinged to the centrifugal weights 34 provided with extensions 35 hinged at 36 on a hub 37 which is keyed on the output shaft 26. On one side the hub 37 rests against the bearing 27 of the stationary cover 28 and on the other side on a helical spring 38 provided between the tubular member 31 and the hub 37. A sleeve 39 is loosely mounted in axially movable relation on a cylindrical projection of the cover 28, which projection corresponds to the external part of the bearing 27. The related sleeve 39 has its inside part 40 conically tapered in conformity with a profile similar to the inclined outside profile of the centrifugal weights 34. An annular lever 41 (Fig. 2a), pivoted at 42 on the stationary housing 3, is capable of engaging by means of grooved shoes 42a with a circular rib 49 provided on the sleeve 39 for imparting to this sleeve an axial movement. The lever 41 is provided with a pawl 44 controlled by a pawl lever 45 and engaging notches 46 provided on the housing 3 along a slot 47 through which passes the free outwardly projecting end of the lever 41, which is provided with a convenient handle.

The operation of the inventive variable-speed transmission described above is as follows: the input shaft 1 rotating at a certain velocity transmits this rotation to the planet carrier 4 which in turn transmits it to spindles 6. Depending on the desired output velocity and sense of rotation it is possible, by means of a convenient commutator and by energizing the pole shoes 23 or 24 respectively, to lock to the pack of laminations 22 the toothed-rim unit 16—17—18 or the toothed-rim unit 19—20—21 respectively. Thus one of these units will be locked to the housing 3 whereby the pinion 7, which is directly meshing with the rim of the central wheel 16, or the pinion 8, which is meshing with the rim of the central wheel 19 by means of the sprocket chain 25, will be compelled to roll in the same manner as it occurs in epicyclic gearings. The spindles 6 will thus be obliged to rotate with the same velocity with which the pinion 7 or 8 rotates. Obviously the V-groove pulley elements 9—10 will rotate with the spindles 6 and will impart the driving motion to the transmission band member 29a, in the form of a V-belt which will transmit rotation to the pulley elements 29—30 and therethrough to the output shaft 26. If a variation of the transmission ratio is desired, the lever 41 has to be shifted for instance to the right with respect to Fig. 1 whereby the centrifugal weights 34, under the action of the centrifugal force, will tend to move away from the axis of the shaft 26, thereby obliging the pulley element 30 to move away from the pulley element 29 and causing the distance between the respective opposite faces forming the V-groove to increase. The zone of engagement of the V-belt 29a with pulley elements 29 and 30 will thus define a smaller diameter, whereby the belt 29a will lose its stretch. As a consequence, owing to the action of springs 12, the pulley elements 10 will be automatically urged against the pulley elements 9, reference being made to each unit 9—10, whereby the diameter determined by the engagement zones of the V-belt 29a with elements 9—10 will increase, re-establishing the necessary tension of the belt 29a. Thus a reduction of the active diameter of the driven pulleys 29—30 and an increase of the active diameter of driving pulleys 9—10 will occur, resulting in a consequent reduction of the transmission ratio. In Fig. 3 there are diagrammatically plotted the curves of variation of the transmission ratio vs. the variation of an active parameter (diameter or the like) of the pulley units 9—10 and 29—30. From the diagram it can be seen that these curves have a hyperbolic shape, one of its asymptotes starting with the transmission ratio +1 and extending up to the + infinite ratio, the other asymptote starting with — infinite ratio and extending up to zero; the latter value is reached upon the equalization of certain parameters of units 9—10 and 7—8.

In fact, for a certain active diameter of the units 9—10 and 29—30, no motion will be transmitted, that is the driven output shaft will remain still in spite of the rotation of the input shaft, as established by the following well-known rule $$\text{Transmission ratio} = -\frac{R_1 \times R_2}{R_3 \times R_4 - R_1 \times R_2}$$

where $R_1$ = a parameter (e.g. diameter, number of teeth etc.) of the pinion 7 or 8,
$R_2$ = a parameter of the pulley unit 29—30,
$R_3$ = a parameter of stationary toothed rims 16 or 19,
$R_4$ = a parameter of pulley unit 9—10, the term "parameter" being intended to include e.g. the pitch diameter, the number of teeth or a similar speed-determining factor of each engaging wheel.

It will be apparent from the diagram of Fig. 3 that for certain values of $R_4$ the transmission ratio will be negative, that is a reversion of the sense of rotation of the output shaft with respect to the input shaft will take place.

Furthermore, it will be apparent that when the denominator of the above expression is zero the transmission ratio will be infinite, i.e. the output shaft will stand still in spite of the rotation of the input shaft.

As a consequence, taking into account the hyperbolic course of the transmission ratio, it will be apparent that a small variation of the parameters $R_2$, $R_4$ will result in a remarkable variation of the transmission ratio, this being very useful in cases where a change of one transmission ratio to another very different transmission ratio is rapidly desired.

Referring, now to Fig. 4, corresponding parts will be indicated with like reference numerals, accompanied by a prime mark ('), and will not be further described in detail. Onto the input shaft 1' a cross-member or planet carrier 4' is keyed whereon spindles 6' are journaled. On one side of the planet carrier 4' a respective pinion 7' is keyed to each spindle 6' whereas on the opposite side of the planet carrier there are keyed to each spindle three toothed wheels 50, 51, 52 of progressively decreasing diameters. On the output shaft 26' there is mounted, in rigid rotational relation, the discoidal element 53 of a friction coupling, the counter-element 54 of which is loosely mounted on the output shaft, in axially movable relation, and is provided with an external rib 55 which may be engaged by the forked end 56 of a lever 57 projecting from the housing 3'—28' through a slot 58, the handle of the lever 57 co-operating with an auxiliary lever 59 operating a pawl 60 engageable with a rack 61 provided on the housing 3'—28'. The counter-element 54 has two bevelled peripheral engaging surfaces 62 and 63, one of them being able to come into frictional engagement with a beveled counter-engaging surface 64 provided on a hub 65 which is loosely mounted on the output shaft 26' and forms an integral unit with a toothed rim 66, the other surface 63 being able to engage with another bevelled counter-engaging surface 67 of a rotating unit which is loosely mounted on the unit 64—65—66 and provided with another toothed inside rim 68. Both toothed rims 66 and 68 with incidentally very different diameters mesh with pinions 7'. The unit 67—68 is provided with an external annular rib 69 engaged by a forked end 70 of another lever 71, projecting from the housing 3'—28' through a slot 72 and cooperating with an auxiliary lever 73 on which a pawl 74 removably engages a rack 75 on the housing 3'—28'.

On the input shaft 1' toothed wheels 76—77—78 of different diameters are mounted and are engageable with toothed wheels 50—51—52 respectively. The hubs of these toothed wheels 76—77—78 have respective axial grooves along which a clutching key 79 may slide, guided within the housing 3'. The operating part of the key 79 has such an axial dimension that it locks to the stationary housing 3' only one of the toothed wheels 76, 77 or 78 at a time.

The operation of the device will be readily apparent. Upon displacement of the handle of the lever 57 to the left, in Fig. 4, the annular surface 62 will be disengaged from the counter-surface 64, and upon a displacement of the handle of the lever 71 to the left, the countersurface 67 will engage the co-operating surface 63. Thus the toothed rim 68 will be obliged to rotate through its entrainment by the pinion 7', while the rim 64 will remain idle on the unit 64—65—66.

On the other hand the pinion 7' is obliged to move around the axis of the input shaft 1', since said wheel is driven by the spindle 6' which rotates together with the planet carrier 4' and jointly with the shaft 1'.

Furthermore, spindles 6' obtain their own rotary motion from any one of the toothed wheels 50, 51 and 52. Upon the displacement of the key 79, one of the toothed wheels 76—77 or 78 will be locked to the housing 3' whereby one of the wheels 50, 51, 52 will be obliged to roll on the engaged rim pertaining to that of the one of toothed wheels 76, 77 and 78 which is locked, the rolling being transmitted to the respective spindle 6'.

The motion received by the toothed rims 68 or 66 will thus be transmitted to the output shaft 26' by means of the friction coupling 67—64—54—53.

While by means of such an arrangement of toothed wheels a stepwise variation of the transmission ratio will be obtained, it is obvious that the considerations made in respect of Fig. 1 and in respect of the possibility of obtaining negative transmission ratios, i.e. reversed rotation, remain unchanged.

Referring now to Fig. 5 parts similar to those of Fig. 1 or Fig. 4 will be indicated by the same reference numerals marked with a double prime, thus obviating the need for a further detailed description.

The output shaft 26" is, here, rigidly connected with one of the elements 80 of a hydraulic coupling 80, 82, of the twin-disc type, provided with vanes 81, 84 within the toroidical body formed by the semi-tore 85 rigidly connected with the element 80, and by the semi-tore 83 rigidly connected with the other element 82 forming the hydraulic coupling. To the semi-tore 83 there is secured the toothed rim 68" which the pinion 7" engages. For the remaining parts the structure remains substantially identical with that of the embodiment illustrated in Fig. 4.

In practice it is possible to provide different combinations of belt arrangements as in Fig. 1 and toothed-wheel arrangements as in Figs. 4 or 5. It is obvious that the belt represents merely one of several conventional flexible transmission members such as chains, bands and the like. Likewise the toothed wheels represent one type of a variety of conventional transmission means such as friction gearings, bevel gears and the like.

In actual use it will be necessary, for improved operation, to choose and design the dimensions of elements by taking into account the range of transmission ratios with which the apparatus will have to operate, the output sense of rotation, and within the range of speed variation, the zones of maximum efficiency, and consequently the one or the other type of transmission will be used, e.g. the toothed-wheel gearing, belt or chain drives, or a combination thereof.

The disclosed apparatus can be employed in a large number of fields and its usefulness is remarkable in cases where a transformation of torques is desired, as generally occurs in machine design, starting with machine tools and ending with specific control devices for ships, automobiles and the like.

Although hereinabove only several preferred embodiments were described the inventive scope is not intended to be limited by the illustrated specific details and the right is reserved to all modifications and variations within the ambit of the appended claims.

I claim:

1. A variable-speed transmission comprising an input shaft, a planet carrier rigidly mounted on said input shaft, a spindle rotatably lodged in said planet carrier, a first and a second drive wheel rigidly mounted on said spindle, a first and a second central wheel freely rotatable on said input shaft, said first central wheel and said first drive wheel being provided with matingly engaging teeth, endless-band means operatively interconnecting said second central wheel and said second drive wheel for mutual entrainment, control means operable for selectively immobilizing either of said central wheels, a first V-groove pulley on said spindle, an output shaft coaxial with said input shaft, a second V-groove pulley on said output shaft, said first and said second V-groove pulleys having resiliently approachable frusto-conical faces forming the V-grooves of said V-groove pulleys, an endless V-belt interconnecting said pulleys, and control means for controlling the distance between said frusto-conical faces.

2. A variable-speed transmission comprising an input shaft, a planet carrier rigidly mounted on said input shaft, a pair of spindles rotatably lodged in said planet carrier at diametrically opposite locations, a first and a second drive wheel rigidly mounted on each of said spindles, a first and a second central wheel freely rotatable on said input shaft, said first central wheel and said first drive wheels being provided with matingly engaging teeth, endless-band means operatively interconnecting said second central wheel and said second drive wheels for mutual entrainment, control means operable for selectively immobilizing either of said central wheels, a first V-groove pulley on said spindles, an output shaft coaxial with said input shaft, a second V-groove pulley on said output shaft, said first and said second V-groove pulleys having resiliently approachable frusto-conical faces forming the V-grooves of said V-groove pulleys, an endless V-belt interconnecting said pulleys, and control means for controlling the distance between said frusto-conical faces.

3. A variable-speed transmission comprising an input shaft, a planet carrier rigidly mounted on said input shaft, a spindle rotatably lodged in said planet carrier, a first and a second drive wheel rigidly mounted on said spindle, a first and a second central wheel carried on said input shaft in mating engagement with said first and said second drive wheel, respectively, said central wheels being provided with telescoped hubs traversed by said input shaft with freedom of relative rotation, the inner of said hubs projecting axially beyond the outer hub, control means alternately engageable with the projecting part of said inner hub and with said outer hub for selectively immobilizing either of said central wheels, a first V-groove pulley on said spindle, an output shaft coaxial with said input shaft, a second V-groove pulley on said output shaft, said first and said second V-groove pulleys having resiliently approachable frustoconical faces forming the V-grooves of said V-groove pulleys, an endless V-belt interconnecting said pulleys, and control means for controlling the distance between said frusto-conical faces.

4. A transmission according to claim 3, further comprising a stationary housing, said hubs being provided with radially extending flanges, said control means including electromagnetic means on said housing adapted to attract either of said flanges.

5. A transmission according to claim 4, wherein said electromagnetic means is positioned on the inner periphery of said housing at a location between said flanges.

6. In a variable-speed transmission, in combination, a drive shaft, a driven shaft, a first V-groove pulley on said drive shaft, a second V-groove pulley on said driven shaft, each of said pulleys being split into two halves having freedom of relative axial displacement on the respective shaft for varying the effective diameter of its V-groove, an endless V-belt interconnecting said pulleys, spring means on each of said shafts urging the halves of said pulleys toward each other, centrifugal-governor means on one of said shafts operatively coupled with the respective pulley for urging its halves apart against the force of the associated spring means with increasing rotary speeds, and control means engageable with said governor means for selectively limiting the operating stroke of said governor means and, with it, the extent of separation of the halves of the last-mentioned pulley, thereby altering the speed ratio of said pulleys.

7. The combination according to claim 6 wherein said governor means is provided with a pair of diametrically opposite, pivoted arms having weighted extremities, said control means including an axially displaceable sleeve with tapering inner periphery mounted for engagement with said extremities in coaxial relationship with said one of said shafts.

8. In a variable-speed transmission, in combination, an input shaft, a planet carrier rotatably mounted on said input shaft, a pair of auxiliary shafts rotatably lodged in said planet carrier at diametrically opposite locations, an output shaft coaxial with said input shaft, coupling means for rotating said auxiliary shafts in unison upon their revolution around said input and output shafts on said planet carrier, a pair of first V-groove pulleys respectively keyed to said auxiliary shafts, a second V-groove pulley on said output shaft, each of said pulleys being split into two halves having freedom of relative axial displacement on the respective shaft for varying the effective diameter of its V-groove, an endless V-belt interconnecting all of said pulleys, spring means on said auxiliary shafts and on said output shaft urging the halves of said pulleys toward each other, centrifugal-governor means on said output shaft operatively coupled with said second pulley for urging its halves apart against the force of the associated spring means with increasing rotary speeds, and control means engageable with said governor means for selectively limiting the operating stroke of said governor means and, with it, the extent of separation of the halves of said second pulley, thereby altering the speed ratio of said first and second pulleys.

9. A variable-speed transmission comprising a housing, an input shaft rotatably mounted in said housing, a planet carrier rigidly mounted on said input shaft, a pair of auxiliary shafts rotatably lodged in said planet carrier at diametrically oposite locations, an output shaft rotatably mounted in said housing in coaxial relationship with said input shaft, a first and a second drive wheel rotatably mounted on each of said auxiliary shafts, a first and a second wheel carried on said input shaft in mating engagement with said first and second drive wheel, respectively, on each auxiliary shaft, said first and second central wheels being respectively provided with an inner and an outer hub telescoped in each other and traversed by said input shaft with freedom of relative rotation, said inner hub projecting axially beyond said outer hub, said hubs being provided with radially extending flanges, electromagnetic means positioned on the inner periphery of said housing between said flanges, said electromagnetic means being operable for selective immobilization of either of said central wheels by attraction of the respective flange, a first V-groove pulley on each of said auxiliary shafts, a second V-groove pulley on said output shaft, each of said pulleys being split into two halves having freedom of relative axial displacement on the respective shaft for varying the effective diameter of its V-groove, an endless V-belt interconnecting all of said pulleys, spring means on said auxiliary shafts and on said output shaft urging the halves of said pulleys toward each other, centrifugal-governor means on said output shaft operatively coupled with said second pulley for urging its halves apart against the force of the associated spring means with increasing rotary speeds, and control means engageable with said governor means for selectively limiting the operating stroke of said governor means and, with it, the extent of separation of the halves of said second pulley, thereby altering the speed ratio of said first and second pulleys.

10. A transmission according to claim 9 wherein each of said second drive wheels and said second central wheel is a sprocket wheel, further comprising an endless chain interconnecting all of said sprocket wheels.

11. A transmission according to claim 9 wherein said governor means is provided with a pair of diametrically opposite, pivoted arms having weighted extremities, said control means including an axially displaceable sleeve with tapering inner periphery coaxially surrounding said output shaft, said sleeve having an outer annular shoulder, and an actuating lever swingably secured to said housing in operative engagement with said shoulder.

References Cited in the file of this patent

UNITED STATES PATENTS

| 795,386 | Cutter | July 25, 1905 |
| 863,317 | Richards | Aug. 13, 1907 |
| 1,203,265 | Radcliffe | Oct. 31, 1916 |
| 1,344,366 | Wickerham | June 22, 1920 |
| 2,158,367 | Henney | May 16, 1939 |
| 2,440,625 | Weimer | Apr. 25, 1948 |
| 2,529,743 | Salsbury et al. | Nov. 14, 1950 |
| 2,580,656 | Clerk | Jan. 1, 1952 |

FOREIGN PATENTS

| 7,318 | France | July 6, 1907 |
| 899,231 | France | May 24, 1945 |